(12) United States Patent
Kim et al.

(10) Patent No.: US 9,866,360 B2
(45) Date of Patent: Jan. 9, 2018

(54) USER EQUIPMENT APPARATUS AND METHOD FOR FEEDING BACK CHANNEL STATE INFORMATION IN A WIRELESS COMMUNICATION SYSTEM

(71) Applicant: LG ELECTRONICS INC., Seoul (KR)

(72) Inventors: Hyung Tae Kim, Anyang-si (KR); Han Byul Seo, Anyang-si (KR); Ki Jun Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 14/335,675

(22) Filed: Jul. 18, 2014

(65) Prior Publication Data

US 2014/0334409 A1 Nov. 13, 2014

Related U.S. Application Data

(63) Continuation of application No. 13/639,062, filed as application No. PCT/KR2011/002315 on Apr. 4, 2011, now Pat. No. 8,811,520.

(Continued)

(30) Foreign Application Priority Data

Apr. 1, 2011 (KR) .................. 10-2011-0030168

(51) Int. Cl.
*H04L 5/00* (2006.01)
*H04B 7/06* (2006.01)
(Continued)

(52) U.S. Cl.
CPC ......... *H04L 5/0057* (2013.01); *H04B 7/0417* (2013.01); *H04B 7/0486* (2013.01);
(Continued)

(58) Field of Classification Search
CPC ................ H04B 7/0626; H04B 7/0639
See application file for complete search history.

(56) References Cited

U.S. PATENT DOCUMENTS

2007/0230397 A1 10/2007 Sakata
2007/0298728 A1* 12/2007 Imamura ............... H04L 5/006
455/77

(Continued)

FOREIGN PATENT DOCUMENTS

CN 101019358 A 8/2007
CN 101388699 A 3/2009
(Continued)

OTHER PUBLICATIONS

Ericsson, "Rank Override Support for Precoder Confirmation", 3GPP TSG-RAN WG1 #52bis, Shenzhen, China, Mar. 31-Apr. 4, 2008, R1-081540, 3 pages.

(Continued)

*Primary Examiner* — Jenee Holland
(74) *Attorney, Agent, or Firm* — Birch, Stewart, Kolasch & Birch, LLP

(57) ABSTRACT

A method for transmitting a Channel State Information (CSI) reporting at a user equipment (UE) in a wireless communication system is disclosed. The method includes transmitting a rank indicator (RI) and a first type precoding matrix indicator (PMI) to a base station (BS) according to a first CSI feedback type; transmitting a second type PMI to the BS according to a second CSI feedback type, wherein the RI and the first type PMI are jointly coded, and transmitted through a physical uplink control channel (PUCCH), wherein the RI and the second type PMI are not jointly coded, and transmitted through the PUCCH, wherein a transmission period of the first type PMI is different than a transmission period of the second type PMI, wherein the transmission period of the first type PMI is longer than the (Continued)

transmission period of the second type PMI, and wherein the RI is 2, 3 or 4 bits, and a size of the jointly coded RI and the first type PMI are 4 bits.

12 Claims, 6 Drawing Sheets

Related U.S. Application Data

(60) Provisional application No. 61/320,324, filed on Apr. 2, 2010, provisional application No. 61/332,807, filed on May 9, 2010, provisional application No. 61/363,287, filed on Jul. 12, 2010.

(51) Int. Cl.
*H04B 7/04* (2017.01)
*H04L 1/00* (2006.01)
*H04B 7/0417* (2017.01)
*H04W 72/04* (2009.01)

(52) U.S. Cl.
CPC ............ *H04B 7/063* (2013.01); *H04B 7/065* (2013.01); *H04B 7/0626* (2013.01); *H04B 7/0632* (2013.01); *H04B 7/0634* (2013.01); *H04B 7/0639* (2013.01); *H04L 1/0026* (2013.01); *H04L 1/0029* (2013.01); *H04W 72/0413* (2013.01)

(56) References Cited

U.S. PATENT DOCUMENTS

| | | | |
|---|---|---|---|
| 2008/0219370 | A1 | 9/2008 | Onggosanusi et al. |
| 2008/0273624 | A1* | 11/2008 | Kent ............... H04B 7/0632 375/296 |
| 2009/0046805 | A1 | 2/2009 | Kim et al. |
| 2009/0190528 | A1 | 7/2009 | Chung et al. |
| 2009/0201825 | A1 | 8/2009 | Shen et al. |
| 2009/0207784 | A1* | 8/2009 | Lee ............... H04B 7/063 370/328 |
| 2009/0207797 | A1* | 8/2009 | Shen ............... H04L 5/0053 370/329 |
| 2009/0245169 | A1* | 10/2009 | Zhang ............... H04L 1/0026 370/328 |
| 2009/0247214 | A1 | 10/2009 | Cai et al. |
| 2010/0002598 | A1 | 1/2010 | Pan et al. |
| 2010/0002664 | A1* | 1/2010 | Pan ............... F03B 13/00 370/338 |
| 2010/0027456 | A1 | 2/2010 | Onggosanusi et al. |
| 2010/0034312 | A1 | 2/2010 | Muharemovic et al. |
| 2010/0041344 | A1* | 2/2010 | Kim ............... H04L 1/0026 455/69 |
| 2010/0098012 | A1 | 4/2010 | Bala et al. |
| 2010/0202311 | A1 | 8/2010 | Lunttila et al. |
| 2010/0202372 | A1* | 8/2010 | Chun ............... H04L 5/0057 370/329 |
| 2010/0272033 | A1 | 10/2010 | Fwu et al. |
| 2010/0273435 | A1 | 10/2010 | Sun et al. |
| 2010/0284351 | A1 | 11/2010 | Liang et al. |
| 2011/0032872 | A1* | 2/2011 | Han ............... H04B 7/065 370/328 |
| 2011/0077040 | A1 | 3/2011 | Nammi et al. |
| 2011/0080965 | A1* | 4/2011 | Liu ............... H04L 25/0224 375/260 |
| 2011/0110451 | A1 | 5/2011 | Tsai et al. |
| 2011/0249578 | A1* | 10/2011 | Nayeb Nazar ........ H04L 1/0027 370/252 |
| 2011/0255613 | A1* | 10/2011 | Xia ............... H04B 7/063 375/259 |
| 2011/0268067 | A1 | 11/2011 | Seo et al. |
| 2011/0273993 | A1 | 11/2011 | Mazzarese et al. |
| 2012/0003945 | A1* | 1/2012 | Liu ............... H04B 7/0639 455/115.1 |
| 2012/0063500 | A1 | 3/2012 | Wang et al. |
| 2012/0082042 | A1 | 4/2012 | Lunttila et al. |
| 2012/0088458 | A1* | 4/2012 | Nogami ............... H04B 7/0632 455/67.11 |
| 2012/0127869 | A1* | 5/2012 | Yin ............... H04L 1/0031 370/252 |
| 2012/0140708 | A1 | 6/2012 | Choudhury et al. |
| 2012/0147933 | A1 | 6/2012 | Li et al. |
| 2012/0213310 | A1 | 8/2012 | Ko et al. |
| 2012/0218948 | A1 | 8/2012 | Onggosanusi et al. |
| 2012/0314613 | A1 | 12/2012 | Zhang et al. |
| 2013/0028225 | A1 | 1/2013 | Ko et al. |

FOREIGN PATENT DOCUMENTS

| | | |
|---|---|---|
| CN | 101615979 A | 12/2009 |
| JP | 2007-274094 A | 10/2007 |
| JP | 2009-111781 A | 5/2009 |
| JP | 2012-525785 A | 10/2012 |
| WO | WO 2009/022811 A1 | 2/2009 |
| WO | WO 2009/023850 A1 | 2/2009 |
| WO | WO 2010/013950 A2 | 2/2010 |

OTHER PUBLICATIONS

Samsung, "Relationship of Rank Report and PUCCH CQI/PMI reports", 3GPP TSG-RAN Working Group 1#53, Kansas City, U.S.A, May 5-9, 2008, R1-081746, 4 pages.

Qualcomm Europe, "Details on CQI Format," 3GPP TSG-RAN WG1 #51 bis, R1-080492, Sevilla, Spain, Jan. 14-18, 2008 (retrieved on Jan. 9, 2008), pp. 1-7, XP-50109008A.

Texas Instruments, "CQI, PMI, and Rank Reports for E-UTRA," 3GPP TSG RAN WG1 52, R1-080712, Sorrento, Italy, Feb. 11-15, 2008 (retrieved on Feb. 6, 2008), pp. 1-6, XP-50109205A.

Samsung, "Further performance evaluations of differential codebooks for Rel. 8 PMI enhancements," 3GPP TSG RAN WG1 Meeting #60, R1-101164, San Francisco, USA, Feb. 22-26, 2010, pp. 1-6 (12 pages).

Sharp, "PMI Synchronization issues," 3GPP TSG RAN WG1 Meeting #52bis, R1-081244, Shenzhen, China, Mar. 31-Apr. 4, 2008, 9 pages (18 pages).

3GPP, "3rd Generation Partnership Project; Technical Specification Group Radio Access Network; Evolved Universal Terrestrial Radio Access (E-UTRA); Physical layer procedures (Release 8)," 3GPP TS 36.213 V8.6.0, Mar. 2009, 4 pages.

Motorola, "On Extensions to Rel-8 PMI Feedback," 3GPP TSG RAN1#60, R1-101129, San Francisco, USA, Feb. 22-26, 2010, pp. 1-4.

* cited by examiner

USER EQUIPMENT APPARATUS AND METHOD FOR FEEDING BACK CHANNEL STATE INFORMATION IN A WIRELESS COMMUNICATION SYSTEM

CROSS-REFERENCE TO RELATED APPLICATIONS

This application is a continuation of co-pending U.S. patent application Ser. No. 13/639,062 filed on Oct. 2, 2012, which is the National Phase of PCT/KR2011002315 filed on Apr. 4, 2011, which claims the benefit of U.S. Provisional Application No. 61/320,324 filed Apr. 2, 2010, 61/332,807 filed May 9, 2010, and 61/363,287 filed Jul. 12, 2010, and to Korean patent application No. 10-2011-0030168 filed on Apr. 1, 2011, the entire contents of all of the above applications are hereby incorporated by reference.

BACKGROUND OF THE INVENTION

Field of the Invention

The present invention relates to wireless communication, and more particularly, to a User Equipment (UE) apparatus and method for feeding back Channel State Information (CSI) in a wireless communication system.

Discussion of the Related Art

In a cellular Multiple Input Multiple Output (MIMO) communication environment, data rate can be increased through beamforming between a transmitting end and a receiving end. It is determined based on channel information whether to use beamforming or not. Basically, the receiving end quantizes channel information estimated from a Reference Signal (RS) to a codebook and feeds back the codebook to the transmitting end.

A brief description will be given of a spatial channel matrix (also referred to simply as a channel matrix) for use in generating a codebook. The spatial channel matrix or channel matrix may be expressed as $$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

where $H(i,k)$ denotes the spatial channel matrix, $N_r$ denotes the number of Reception (Rx) antennas, $N_t$ denotes the number of Transmission (Tx) antennas, r denotes the index of an Rx antenna, t denotes the index of a Tx antenna, i denotes the index of an Orthogonal Frequency Division Multiplexing (OFDM) or Single Carrier-Frequency Division Multiple Access (SC-FDMA) symbol, and k denotes the index of a subcarrier. Thus $k_{r,t}(i,k)$ is an element of the channel matrix $H(i,k)$, representing the channel state of a $t^{th}$ Tx antenna and an $r^{th}$ Rx antenna on a $k^{th}$ subcarrier and an $i^{th}$ symbol.

A spatial channel covariance matrix R applicable to the present invention is expressed as $R=E[H(i,k)H^H(i,k)]$ where H denotes the spatial channel matrix, E[ ] denotes a mean, i denotes a symbol index, and k denotes a frequency index.

Singular Value Decomposition (SVD) is one of significant factorizations of a rectangular matrix, with many applications in signal processing and statistics. SVD is a generalization of the spectral theorem of matrices to arbitrary rectangular matrices. Spectral theorem says that an orthogonal square matrix can be unitarily diagonalized using a base of eigenvalues. Let the channel matrix H be an m×m matrix having real or complex entries. Then the channel matrix H may be expressed as the product of the following three matrices.

$$H_{m \times m} = U_{m \times m} \sum\nolimits_{m \times n} V^H_{n \times n}$$

where U and V are unitary matrices and $\Sigma$ is an m×n diagonal matrix with non-negative singular values. For the singular values, $\Sigma=\mathrm{diag}(\sigma_1 \ldots \sigma_r)$, $\sigma_i=\sqrt{\lambda_2}$. The directions of the channels and strengths allocated to the channel directions are known from the SVD of the channels. The channel directions are represented as the left singular matrix U and the right singular matrix V Among r independent channels created by MIMO, the direction of an $i^{th}$ channel is expressed as $i^{th}$ column vectors of the singular matrices U and V and the channel strength of the $i^{th}$ channel is expressed as a $\sigma_i^2$. Because each of the singular matrices U and V is composed of mutually orthogonal column vectors, the $i^{th}$ channel can be transmitted without interference with a $j^{th}$ channel. The direction of a dominant channel having a large $\sigma_i^2$ value exhibits a relatively small variance over a long time or across a wide frequency band, whereas the direction of a channel having a small $\sigma_i^2$ value exhibits a large variance.

This factorization into the product of three matrices is called SVD. The SVD is very general in the sense that it can be applied to any matrices whereas EigenValue Decomposition (EVD) can be applied only to orthogonal square matrices. Nevertheless, the two decompositions are related. If the channel matrix H is a positive, definite Hermitian matrix, all eigenvalues of the channel matrix Ii are non-negative real numbers. The singular values and singular vectors of the channel matrix H are its eigenvalues and eigenvectors.

The EVD may be expressed as $$HH^H=(U\Sigma V^H)(U\Sigma V^H)^H=U\Sigma\Sigma^H U^H$$

$$H^H H=(U\Sigma V^H)^H(U\Sigma V^H)=V\Sigma\Sigma^H V^H$$

where the eigenvalues may $\lambda_1 \ldots \lambda_r$. Information about the singular matrix U representing channel directions is known from the SVD of $HH^H$ and information about the singular matrix V representing channel directions is known from the SVD of $H^H H$. In general, Multi-User MIMO (MU-MIMO) adopts beamforming at a transmitting end and a receiving end to achieve high data rates. If reception beams and transmission beams are represented as matrices T and W respectively, channels to which beamforming is applied are expressed as $THW=TU(\Sigma)V^H W$. Accordingly, it is preferable to generate reception beams based on the singular matrix U and to generate transmission beams based on the singular matrix V.

The major considerations in designing a codebook are reduction of feedback overhead by using a minimum number of bits and accurate quantization of CSI to achieve a sufficient beamforming gain.

SUMMARY OF THE INVENTION

An object of the present invention devised to solve the problem lies on a method for feeding back Channel State Information (CSI) at a User Equipment (UE).

Another object of the present invention devised to solve the problem lies on a UE apparatus for feeding back CSI.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

The object of the present invention can be achieved by providing a method for feeding back CSI at a UE in a wireless communication system, including determining a Rank Indicator (RI) for a predetermined frequency band, selecting an index of a Preceding Matrix Indicator (PMI) corresponding to the determined RI from a codebook set used for a transmission on the predetermined frequency band, and transmitting the RI and the index of the PMI to a Base Station (BS). The RI and the index of the PMI are jointly encoded prior to the transmission.

The joint-coded RI and index of the PMI may be transmitted in the same subframe to the BS.

The joint-coded RI and index of the PMI may be transmitted on a Physical Uplink Control Channel (PUCCH) to the BS.

The method may further include receiving information about the predetermined frequency band from the BS and estimating a channel state between the UE and the BS in the predetermined frequency band. The RI may be determined based on the estimated channel state and the index of the PMI may be selected based on the estimated channel state.

The predetermined frequency band may be a wideband and thus the PMI may be a wideband PMI.

In another aspect of the present invention, provided herein is an apparatus for feeding back CSI at a UE in a wireless communication system, including a processor for determining an RI for a predetermined frequency hand and selecting an index of a PMI corresponding to the determined RI from a codebook set used for a transmission on the predetermined frequency band, and a transmission antenna for transmitting the RI and the index of the PMI to a BS. The RI and the index, of the PMI are jointly encoded prior to the transmission.

The UE apparatus may further include a reception antenna for receiving information about the predetermined frequency band from the BS. The processor may estimate a channel state between the UE and the BS in the predetermined frequency band, determine the RI based on the estimated channel state, and select the index of the PMI based on the estimated channel state.

According to various embodiments of the present invention, a UE encodes a Rank Indicator (RI) jointly with a Precoding Matrix Indicator (PMI) and thus transmits the jointly-coded RI and PMI in the same subframe. Therefore, the feedback information is efficiently transmitted.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a $3^{rd}$ Generation Partnership Project Long Term Evolution (3GPP LTE) mobile communication system is being used. However, the description is applicable to any other mobile communication system except for specific features inherent to the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

As examples of a mobile communication system to which the present invention is applicable, 3GPP LTE and LTE-Advanced (LTE-A) communication systems will be described below.

Figure 1:
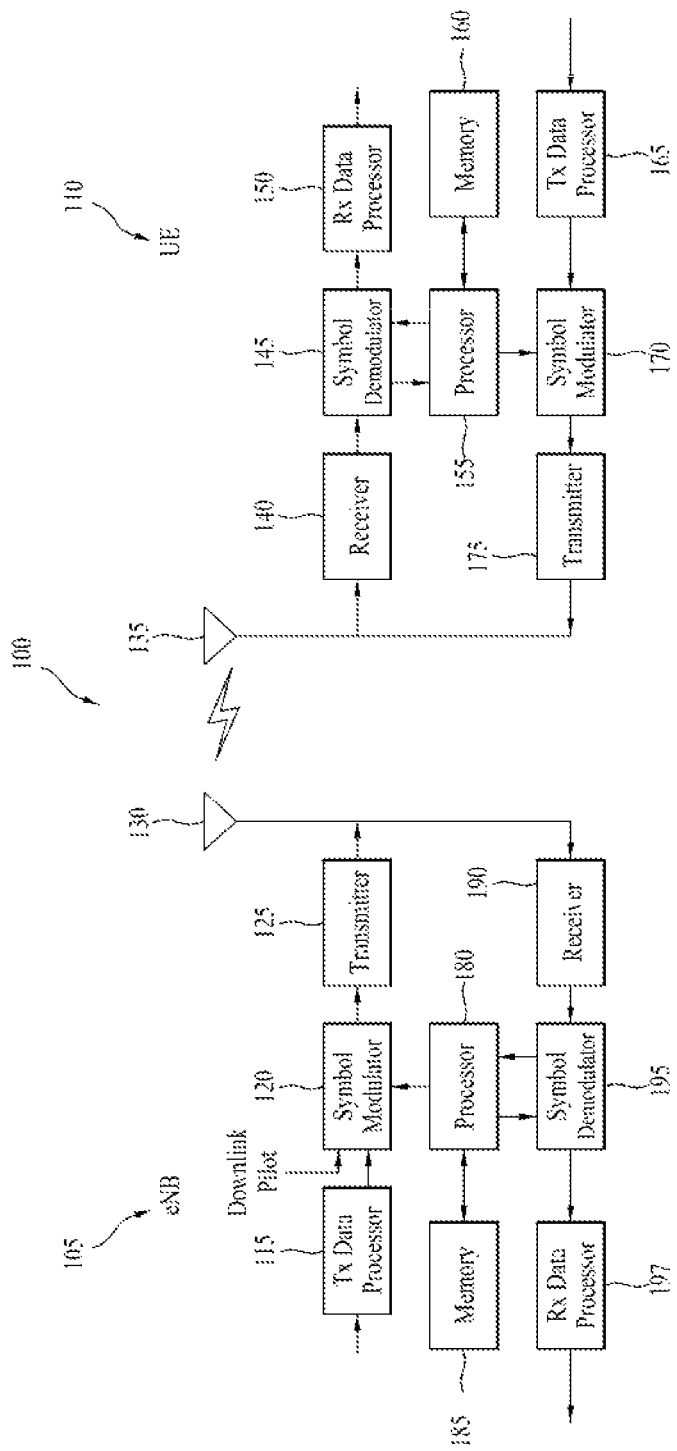
FIG. 1 is a block diagram of an evolved Node B (eNB) and a User Equipment (UE) in a wireless communication system according to the present invention.

FIG. 1 is a block diagram of an eNB and a UE in a wireless communication system according to the present invention.

While one eNB 105 and one UE 110 are shown in FIG. 1 to simplify the configuration of a wireless communication system 100, the wireless communication system 100 may obviously include a plurality of eNBs and/or a plurality of UEs.

Referring to FIG. 1, the eNB 105 may include a Tx data processor 115, a symbol modulator 120, a transmitter 125, a TransmissionReception (Tx/Rx) antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, they include multiple antennas. Hence, the BS 105 and the UE 110 support Multiple Input Multiple Output (MEMO), specifically both Single User-MEMO (SU-MIMO) and Multi User-MIMO (MU-MEMO) in the present invention.

On the downlink, the Tx data processor 115 receives traffic data, processes the received traffic data through formatting, coding, interleaving, and modulation (i.e. symbol mapping), and thus outputs modulated symbols (or data symbols). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be Frequency Division Multiplexing (FDM) symbols. Orthogonal Frequency Division Multiplexing (OFDM) symbols, Time Division Multiplexing (TDM) symbols, or Code Division Multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the eNB 105 and provides the received downlink signal to the receiver 140. The receiver 140 processes the downlink signal, for example, through filtering, amplification and frequency downconversion and converts the processed downlink signal to digital samples. The symbol demodulator 145 demodulates received pilot symbols and outputs the demodulated pilot symbols to the processor 155 for use in channel estimation.

The symbol demodulator 145 receives a frequency response estimate of the downlink from the processor 155 and acquires data symbol estimates (i.e. estimates of the transmitted data symbols) by demodulating the received data symbols using the frequency response estimate. The Rx data processor 150 demodulates the data symbol estimates (i.e. performs symbol demapping), deinterleaves the demodulated data symbols, and decodes the deinterleaved data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the eNB 105 through the antenna 135.

The eNB 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the eNB 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination of them. When a codebook is generated in hardware according to an embodiment of the present invention, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 155 and 180.

On the other hand, if a codebook is generated in firmware or software according to an embodiment of the present invention, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/eNB and a network may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the UE and the network. The UE/eNB and the network exchange RRC messages through the RRC layers.

One of the codebook design schemes proposed by or approved as recent communication standards such as those for mobile communication systems, LTE, LTE-A, Institute of Electrical and Electronics Engineers (IEEE) 802.16m, etc. is a hierarchical codebook transformation scheme in which a long-term Precoding Matrix Indicator (PMI) and a short-term PMI are separately transmitted and a final PMI is determined using the two PMIs. In a major example of the hierarchical codebook transformation scheme, a codebook is transformed using a long-term covariance matrix of channels, as determined by the following equation, [Equation 1].

$$W' = \text{norm}(RW) \qquad \text{[Equation 1]}$$

where W denotes a conventional codebook representing short-term channel information, R denotes the long-term covariance matrix of a channel matrix H, norm(A) denotes a matrix in which the norm is normalized to 1 for each column of a matrix A and W' denotes a final codebook achieved by transforming the conventional codebook W using the channel matrix H, the long-term covariance matrix R of the channel matrix H, and the norm function.

The long-term covariance matrix R of the channel matrix H may be given as $$R = E[H^H H]^{(a)} = V \Lambda V^H = \sum_{i=1}^{Nt} \sigma_i v_i v_i^H \quad \text{[Equation 2]}$$

where $E[H^H]$ is decomposed into $V\Lambda V^H$ in Singular Value Decomposition (SVD), and $\sigma_i$ and $V_i$ are an $i^{th}$ singular value (i.e. an eigenvalue of an $i^{th}$ channel) and an $i^{th}$ singular column vector corresponding to the $i^{th}$ singular value, respectively ($\sigma_1 \geq \sigma_2 \geq \ldots \geq \sigma_m$). Given a single Tx stream, for example, the codebook W is an $N_t \times 1$ vector and the transformed codebook W' satisfies $$W' = \sum_{i=1}^{Nt} \sigma_i v_i (v_i^H W).$$

That is, the transformed codebook W' is determined to be a weighted linear combination of singular vectors. Herein, the weighted factor of the singular column vector $V_i$ is determined to be the product of the singular value $\sigma_i$ and the correlation $v_i^H W$ between the singular column vector $V_i$ and the pre-transformation codeword W.

As a consequence, codewords are densely populated around a dominant singular vector having a large $\sigma_i$ value in the codebook W', thereby enabling more effective quantization.

Figure 2:
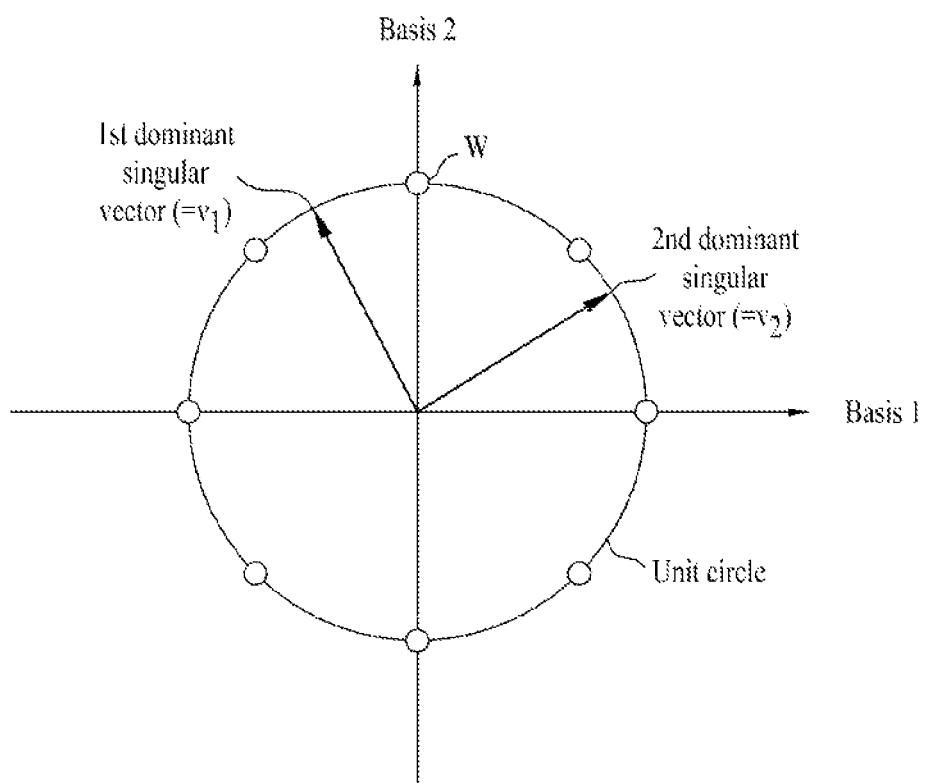
FIGS. 2 and 3 illustrate exemplary methods for generating a codebook.
Figure 3:
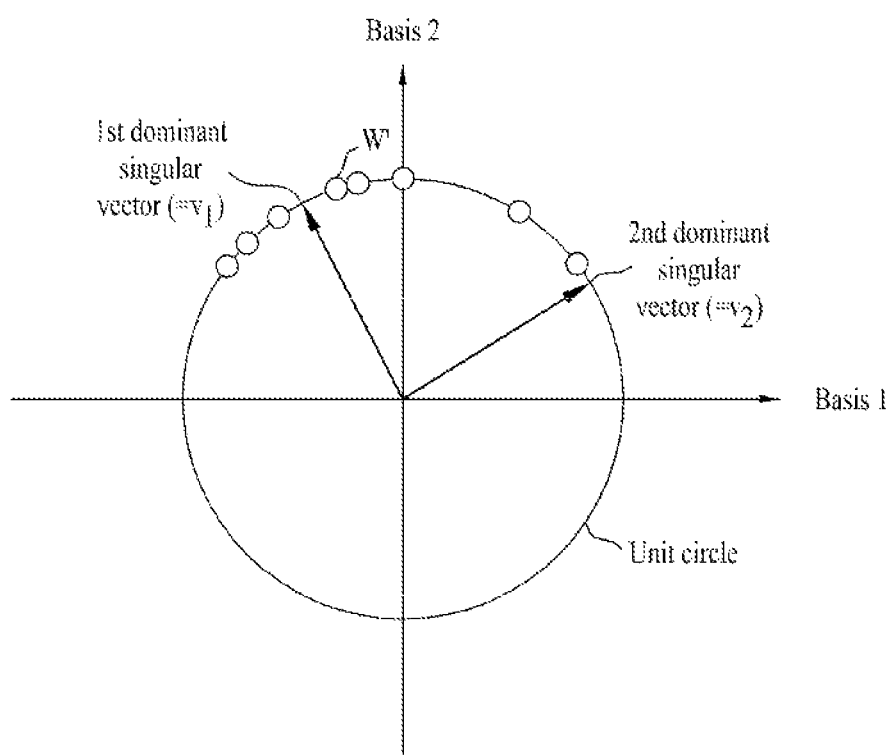

FIGS. 2 and 3 illustrate exemplary methods for generating a codebook.

In FIGS. 2 and 3, on the assumption that $N_t$ is 2 for the sake of convenience, singular vectors and a codebook w are defined in a two-dimensional space. Although any other codeword distribution is possible, the codebook w may have a uniform codeword distribution as illustrated in FIG. 2 according to a policy to maximize the minimum distance between two codewords in a Grassmannian space where channels exist.

The codebook design policy performs well for uncorrelated channels, while it performs poorly for correlated channels. Moreover, since the correlation between a singular vector of instantaneous channels H and a singular vector of a spatial covariance matrix R is high for correlated channels, it is effective to adaptively transform the codebook according to the spatial covariance matrix R based on the relationship.

FIG. 3 illustrates a transformed codebook. As described before, new codewords are densely populated around a first dominant singular vector having a large $\sigma_i$ value by applying a larger weighting factor to the first dominant singular vector. In this manner, as a first dominant singular vector of the long-term covariance matrix R of the channel matrix H is weighted with a higher weighting factor, the codebook W' has codewords densely populated around the first dominant singular vector, as illustrated in FIG. 3. However, in order to generate a codebook having good performance, a minimum distance needs to be maintained between codewords, while the codewords are densely populated around a dominant singular vector.

For a high rank, that is, a rank of 2 or higher, the above codebook transformation scheme faces the problem that the column vectors of the transformed precoder W' are not mutually orthogonal. Even though orthogonality is maintained between the column vectors of the transformed precoder W', a non-unitary matrix is multiplied during the transformation and thus the orthogonality between the column vectors is impaired after the transformation. When the transformed precoder W' is used for real implementation, non-orthogonality between beams carrying streams (represented as the column vectors of transformed precoder W',) additionally causes inter-stream interference.

Moreover, since energy is distributed to a plurality of channels due to the increased rank, performance gain is decreased, relative to the conventional non-transformed codebook. For a low rank, codewords are densely populated in a strong channel direction. In this case, codewords representing channels accurately can be fed back, compared to codewords uniformly distributed in the Grassmannian space. On the contrary, for a high rank, the channel strength is steered not in a specific direction but distributed in a plurality of directions. Therefore, codewords uniformly distributed in the Grassmannian space, that is, pre-transformation codewords can still perform well. This implies that in case of a high rank, good performance can be achieved even though a long-term PMI is fed back with a low granularity using a relatively small number of codewords.

Accordingly, it may be preferable to use different codebooks according to ranks in calculating a long-term PMI. For a low rank, a long-term codebook needs to represent a particular channel direction elaborately and thus has a large size. For a high rank, a small-sited codebook with unitary matrices may be suitable to ensure orthogonality for the transformed precoder W'.

The present invention provides a method for changing a long-term PMI codebook according to a rank to ensure orthogonality for the transformed precoder W'. A codebook for long-term PMIs, C may include a codebook (i.e., $C_{uni}$) with unitary codewords and a codebook (i.e., $C_{cov}$) designed for feedback of long-term covariance channel matrices, as expressed as $$C = C_{uni} \cup C_{cov}, \quad \text{[Equation 3]}$$
$$C_{cov} = \{\tilde{R}_0, \tilde{R}_1, \ldots, \tilde{R}_m\},$$
$$C_{uni} = \{U_0, U_1, \ldots, U_n\}$$

In [Equation 3], if feedback rank information, that is, an RI is equal to or less than k (k is a positive integer), the long-term PMI codebook may be limited to the codebook designed for feedback of long-term covariance channel matrices, $C_{cov}$. If the RI is larger than k, the long-term PMI codebook may be limited to the codebook with unitary codewords, $C_{uni}$.

The following description is given in the context that k=1, by way of example. If the RI is equal to or larger than 2, the long-term PMI codebook may be limited to the codebook including unitary matrices only, $C_{uni}$ in order to make the columns of the transformed precoder W' mutually orthogonal. The codebook $C_{cov}$ include a part or all of the codewords of the codebook $C_{uni}$ or may be disjointed from the codebook $C_{uni}$.

Compared to the codebook $C_{cov}$ that indicates a dominant channel direction and distributes the codewords of the transformed precoder W' toward the dominant channel direction through combination with the predefined precoder W, the codebook $C_{uni}$, primarily aims to ensure the orthogonality of the transformed precoder W' and secondarily aims to increase the granularity of the unitary codebook by rotating the predefined precoder W. Therefore, it is typical that the codebook $C_{cov}$ has a large size for accurate feedback and the codebook $C_{uni}$ has a small size relative to the codebook $C_{cov}$. For instance, the codebook $C_{uni}$ may include only one identity matrix ($C_{uni}=\{I\}$).

Because one short-term PMI constitutes one perfect precoder in the LTE standard, control information and a control channel need to be newly defined for the LTE-A system in which a PMI is divided into a long-term PMI and a short-term PMI. In the legacy LTE system, a UE may periodically transmit CSI feedback information such as an RI, a PMI, and a Channel Quality indicator (CQI) on a Physical Uplink Control CHannel (PUCCH). Due to the limited payload size of the PUCCH, the UE transmits the RI, PMI and CQI on the PUCCH in different subframes. Four feedback types are defined according to CSI feedback information. In feedback type 3, the RI is fed back in a relatively long period relative to the PMI and the CQI and has a small payload size of up to 2 bits.

A newly added long-term PMI is also fed back in a long period. The feedback period of the long-term PMI may be equal to, shorter than, or longer than the feedback period of the RI. Hereinbelow, feedback types are proposed for the long-term PMI according to the RI feedback period and the long-term PMI feedback period according to the present invention.

Embodiment 1

In accordance with an embodiment of CSI feedback according to the present invention, an RI and a long-term PMI may be fed back in the same feedback period. In this case, a UE may jointly encode an RI and a long-term PMI (e.g, an index of long-term PMI) and feed back the joint-coded RI and long-term PMI to an eNB. For a maximum rank of r, a joint-coded codebook C may be given as $$C = C_1 \cup C_2 \ldots \cup C_r,$$ [Equation 4]

where
$C_1 = C_{cov}$,
$C_i = C_{uni}$,
$C_j$ is a long term PMI code book for rank j, ($1 \leq j \leq r$).

If the RI is 1, the UE selects a codeword from the codebook $C_1$ and if the RI is i other than 1, the UE selects a codeword from the codebook $C_i$. Then the UE feeds back the selected codeword to the eNB. The payload size of the joint-coded codebook is computed by $$ceilling\left(\log_2\left(\sum_{i=1}^{r} s(C_i)\right)\right),$$ [Equation 5]

where $s(C_i)$ is the number of codewords included in $C_i$

In [Equation 5], the ceiling function, ceiling( ) represents the least integer equal to or larger than the solution to an equation included in the bracket.

For example, if the maximum rank is 4, $C_i=\{I\}$, ($2 \leq i \leq 4$), and $s(C_i)=13$, long-term PMI and an RI are jointly encoded to a 4-bit codeword as illustrated in Table 1 below.

TABLE 1

| codeword | RI and long-term PMI |
|---|---|
| 0000 | RI = 1 and long-term PMI = 0 |
| 0001 | RI = 1 and long-term PMI = 1 |
| 0010 | RI = 1 and long-term PMI = 2 |
| 0011 | RI = 1 and long-term PMI = 3 |
| 0100 | RI = 1 and long-term PMI = 4 |
| 0101 | RI = 1 and long-term PMI = 5 |
| 0110 | RI = 1 and long-term PMI = 6 |
| 0111 | RI = 1 and long-term PMI = 7 |
| 1000 | RI = 1 and long-term PMI = 8 |
| 1001 | RI = 1 and long-term PMI = 9 |
| 1010 | RI = 1 and long-term PMI = 10 |
| 1011 | RI = 1 and long-term PMI = 11 |
| 1100 | RI = 1 and long-term PMI = 12 |
| 1101 | RI = 2 and long-term PMI = I |
| 1110 | RI = 3 and long-term PMI = I |
| 1111 | RI = 4 and long-term PMI = I |

Referring to Table 1, I represents an identity matrix. If the RI is 2 or higher, the UE may configure a long-term PMI codebook with an identity matrix. Then the UE may jointly encode the RI and a long-term PMI and feed back the joint-coded RI and long-term PMI to the eNB. In this manner, the joint coding-based CSI feedback method can be performed for downlink CSI feedback from a UE to an eNB. In this case, the UE and the eNB may operate in the procedures illustrated in FIGS. 4 and 5, respectively.

Figure 4:
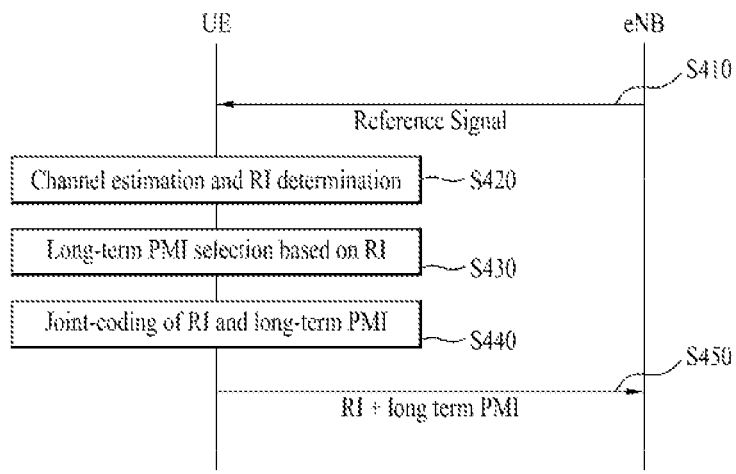
FIG. 4 is an exemplary diagram illustrating a signal flow for an operation for feeding back joint-coded Channel State Information (CSI) at the UE.

FIG. 4 is an exemplary diagram illustrating a signal flow for an operation for feeding back joint-coded CSI at the UE.

Referring to FIG. 4, the UE may receive a DownLink Reference Signal (DL RS) (S410). While not shown in FIG. 4, the eNB may signal to the UE information about a specific frequency band (herein, information about the specific frequency band is previously shared between UE and BS or, the UE may receive information about the specific frequency band from the BS) for which the UE is supposed to feed back CSI, or may preliminarily share the information about the specific frequency band with the UE.

The processor 155 of the UE may determine an RI by estimating the downlink channel state between the UE and the eNB (S420). The processor 155 may determine RI assuming transmission on the specific frequency band in step 420. Specifically, the processor 155 may determine the RI using a channel quality such as a Signal-to-Interference and Noise Ratio (SINR), the correlation between channels received through multiple antennas, etc. in step S420. For a low rank, tank-1 transmission (i.e. RI=1) is optimal in theory and thus an RI of 1 may be selected. As the SINR increases, a higher rank approximate to a multiplexing gain (i.e. $min(N_t,N_r)$) may be selected. In addition, when antennas are near to one another or a signal does not scatter much between the UE and the eNB, a channel correlation is high and thus a high rank cannot be supported. Based on this property, the processor 155 of the UE determines an optimum rank (i.e. RI) in step S420.

The processor 155 may select a long-term PMI (e.g. an index of a wideband Precoding Matrix Indicator (PMI)) corresponding to the determined RI from the codebook set used for the transmission on the specific frequency band (S430). More specially, processor 155 of the UE may select a PMI (e.g. an index of the PMI) corresponding to the determined RI from a codebook set used for the transmission on the specific frequency hand. For example, if the RI is 1, the processor 155 may select a codeword that maintains a minimum distance to a long-term covariance channel matrix from the codebook $C_{cov}$, and if the RI is larger than 1, the processor 155 may select a codeword that maintains a minimum distance to a long-term covariance channel matrix from the codebook $C_{uni}$, as described before with reference to [Equation 4].

The processor 155 jointly encodes the determined RI with the selected long-term PMT (S440). To be more specific, the processor 155 jointly encodes the determined RI with the index of the selected long-term PMI in step S440.

Subsequently, the UE feeds back the joint-coded RI and long-term PMI index to the eNB (S450). The joint-coded information may be fed back in a long period. The eNB may transmit information about the feedback period to the UE by higher layer signaling. The PMI described in steps S430 and S440 may be a wideband PMI. The UE may receive information about the specific frequency band (e.g. wideband) for determining RI and selecting PMI from the BS (not shown in FIG. 4). In general, a long-term PMI transmitted in a long feedback period is a PMI selected for a wideband. The reason for a long-term PMI being a wideband PMI will be described below.

Largely, two types of RSs are defined in a mobile communication system according to their purposes. One type serves the purpose of channel information acquisition and the other type is used for data demodulation. For acquisition of downlink channel information at UEs. RSs of the former type need to be transmitted across a wideband and even a UE that does not receive downlink data in a specific subframe should be able to receive and measure these RSs. Such RSs for channel measurement may also be used for measurement for handover. RS of the latter type are transmitted in resources allocated to a downlink signal that the eNB transmits to the UE. The UE may perform channel estimation using these RSs of the latter type and thus may demodulate data based on the channel estimation. Such demodulation RSs should be transmitted in a data transmission region, Two new types of RSs are largely designed for the LTE-A system, Channel State Information-Reference Signal (CSI-RS) serving the purpose of channel measurement for selection of a Modulation and Coding Scheme (MCS), a PMI, etc. and Demodulation RS (DM-RS) for demodulation of data transmitted through up to eight Tx antennas.

Compared to conventional CRSs used for both purposes of measurement such as channel measurement and measurement for handover and data demodulation in the legacy LTE system, CSI-RSs are designed mainly for channel estimation, although they may also be used for measurement for handover. Since the CSI-RSs are transmitted only for the purpose of acquisition of channel information, they may not be transmitted in every subframe, unlike the CRSs in the legacy LTE system. Accordingly, the CSI-RSs may be configured so as to be transmitted intermittently along the time axis, for reduction of CSI-RS overhead. When data is transmitted in a downlink subframe, DM-RSs are also transmitted dedicatedly to the UE for which the data transmission is scheduled. Thus, DM-RSs dedicated to a particular UE may be designed such that they are transmitted only in a resource area scheduled for the particular UE, that is, only in a time-frequency area carrying data for the particular UE.

As described above, the eNB transmits CSI-RSs intermittently along the time axis in a long period and that across a wideband for the purpose of channel estimation in the LTE-A system. That's why a long-term PMI is a wideband PMI.

Referring to FIG. 4 again, as the RI feedback period and the long-term PMI feedback period are same, the UE may feed back the joint-coded RI and selected PMI index to the eNB in the same subframe (S450).

Now a description will be given below of a method for calculating a short-term PMI and a CQI and feeding back the short-term PMI and CQI to the eNB by the UE. The processor 155 of the UE first performs codebook transformation using a long-term PMI codebook according to [Equation 1] to obtain a short-term PMI codebook W. The short-term PMI codebook W may be determined using a long-term RI as done in conformance to the LTE standard. After calculating an SINR or a transmission amount based on the transformed codebook W', the processor 155 of the UE may calculate an optimum short-term PMI codebook W and a CQI. Because the short-term PMI codebook W and the CQI have a short feedback period, they may be transmitted once or more times within a long-term RI and long-term PMI feedback period. The processor 155 of the UE may use the latest long-term RI and long-term PMI in calculating the short-term PMI codebook W and the CQI.

Figure 5:
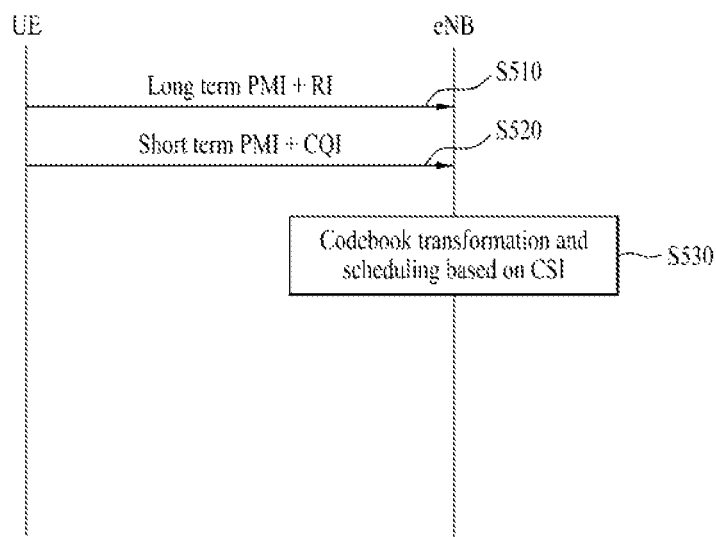
FIG. 5 is an exemplary diagram illustrating a signal flow for an operation for receiving a long-term CSI feedback and a short-term CSI feedback at the eNB.

FIG. 5 is an exemplary diagram illustrating a signal flow for an operation for receiving a long-term CSI feedback and a short-tem CSI feedback at the eNB.

Referring to FIG. 5, the eNB may receive a long-term RI and a long-term PMI from the UE (S510). That is, the eNB receives the RI and PMI in a long feedback period. The eNB may receive a short-term PMI and a CQI from the UE (S520) and perform codebook transformation and CSI-based scheduling (S530). The eNB calculates the codebook W' through codebook transformation in the same manner as done at the UE and performs scheduling using the codebook W' and the CSI feedback (e.g. the CQI and the RI) received from the UE.

Embodiment 2

In another embodiment of CSI feedback according to the present invention, an RI feedback period may be longer than a long-term PMI feedback period. In this case, the UE transmits an RI and a long-term PMI in different periods. Thus the long-term PMI is fed back at least once within the RI feedback period. Like Embodiment 1 in which the RI feedback period is identical to the tong-term PMI period, the long-term PMI (or wideband PMI) is determined according to the RI in Embodiment 2. However, the UE separately encodes the long-term PMI and the RI, rather than it jointly encodes them.

If the RI is 1, the UE sets the codebook $C_{cov}$ as a long-term PMI codebook and feeds hack a quantized codeword of long-term covariance channel matrix selected from the codebook $C_{cov}$ to the eNB. If the RI is larger than 2, the UE sets the codebook $C_{uni}$ as the long-term PMI codebook and feeds back a codeword selected from the codebook $C_{uni}$ to the eNB. If $C_{uni}=\{I\}$ and the RI is not 1, the UE does not need to feed back a long-term PMI because the size of the codebook is 1. Instead, the UE may feed back other information such as a short-term PMI to the eNB in time-frequency resources allocated for transmission of a long-term PMI. In this case, the UE and the eNB may operate as follows.

In Embodiment 2, an RI is determined in the same manner as in Embodiment 1 in which the RI feedback period and the long-term PMI feedback period are identical as illustrated in FIG. 4. The processor 155 of the UE may determine the RI by estimating the downlink channel state between the UE and the eNB and may select a long-term PMI (or a wideband PMI) according to the RI. Then the UE may feed back the determined RI and the selected long-term PMI (i.e. the index of the selected long-term PMI) to the eNB.

If the RI is 1, the processor 155 may select a codeword that maintains a minimum distance to a long-term covariance channel matrix from the codebook $C_{cov}$, and if the RI is larger than 1, the processor 155 may select a codeword that maintains a minimum distance to a long-term covariance channel matrix from the codebook $C_{uni}$. In the latter case, if $C_{uni}=\{I\}$, which implies that the codebook $C_{uni}$ has only one codeword, the UE may use given time-frequency resources for another usage, instead of feeding hack the long-term PMI. For example, the UE may feedback a short-term PMI in the time-frequency resources.

Figure 6:
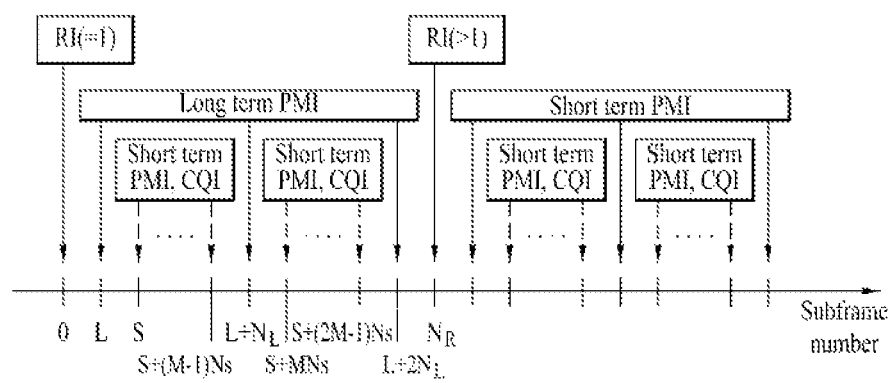
FIG. 6 illustrates exemplary CSI feedbacks from the UE.

FIG. 6 illustrates exemplary CSI feedbacks from the UE.

Referring to FIG. 6, when there are a plurality of pieces of transmittable feedback information in addition to a short-term PMI, the UE also needs to indicate feedback information to the eNB. In FIG. 6. $N_s$, $N_L$ and $N_R$ represent a short-term PMI feedback period, a long-term PMI feedback period, and an RI feedback period, respectively and the short-term PMI feedback period is equal to a CQI feedback period.

An operation for calculating a short-term PMI and a CQI and then feeding back the short-term PMI and CQI at the UE will first be described below.

The processor 155 of the UE first performs codebook transformation using a long-term PMI codebook according to [Equation 1] to obtain a short-term PMI codebook W. The short-term PMI codebook W may be determined using a long-term RI as done in conformance to the LTE standard. After calculating an SINR or a transmission amount based on the transformed codebook W', the processor 155 of the UE may calculate an optimum short-term PMI codebook W and a CQI. Because the short-term PMI codebook W and the CQI have a short feedback period, they may be transmitted once or more times within a long-term RI and long-term PMI feedback period. The processor 155 of the UE may use the latest long-term RI and long-term PMI in calculating the short-term PMI codebook W and the CQI. If the RI is larger than 1 and $C_{uni}=\{I\}$, W'=W, which means that the codebook transformation scheme falls back to a codebook non-transformation scheme.

Now a description will be given of an operation for receiving a long-term CSI feedback and a short-term CSI feedback from the UE at the eNB. The eNB may receive a long-term RI in a longest feedback period and receive a long-tem PMI in a feedback period shorter than the long-term RI feedback period. One thing to note herein is that for a high rank, a long-term PMI can be fixed to one specific value and does not need to be fed back. In this case, in given time-frequency resources from the UE, the eNB may receive, instead of the long-term PMI, a short-term PMI and a CQI or compensation factors to mitigate quantization error of CSI. After the eNB receives a short-term PMI and a CQI in a short feedback period from the UE, the eNB may calculate the transformed codebook W' according to the codebook transformation scheme and then performs scheduling based on the codebook W' and the CSI feedback received from the UE.

Embodiment 3

In a further embodiment of CSI feedback according to the present invention, an RI feedback period may be shorter than a long-term PMI feedback period. In this case, an RI may be fed back once or more times within the long-term PMI feedback period. A long-term PMI codebook that the UE feeds back can be limited to the codebook $C_{cov}$ regardless of rank. In this case, if RI is less than predetermined value, a long-term PMI codebook may be used for actual codebook transformation, otherwise it is not, thus falling back to non-transformation codebook method.

If the UE feeds back downlink to the eNB in this manner, the UE and the eNB may operate as follows, by way of example.

In Embodiment 3, an RI is determined in the same manner as in Embodiment 1 in which the RI feedback period and the long-term PMI feedback period are identical as illustrated in FIG. 4. The processor 155 of the UE may determine the RI by estimating the downlink channel state between the UE and the eNB. However, the processor 155 of the UE may select a codeword that maintains a minimum distance to a long-term covariance channel matrix from the codebook $C_{cov}$, irrespective of the RI and may feed back the selected codeword to the eNB.

Now a description will be given below of a method for calculating a short-term PMI and a CQI and feeding back the short-term PMI and CQI to the eNB by the UE. The processor 155 of the UE first performs codebook transformation using a long-term PMI according to [Equation 1] to obtain a short-term PMI W. The short-term PMI codebook may be determined using a long-term RI as done in conformance to the UE standard. A long-term PMI matrix multiplied by the short-term PMI codebook W is changed according to the RI in the following manner.

If the RI is 1, the processor 155 of the UE performs codebook transformation using the long-term PMI according to the method described in equation 1. If the RI is larger than 1, the UE just assumes that long-term PMI is identity matrix and processor 155 of the UE performs codebook transformation described in equation 1. After calculating an SINR or a transmission amount based on the transformed codeword W', the processor 155 of the UE calculates an optimum short-term PMI W and a CQI based on the calculated SINR or transmission amount. Because the short-term PMI W and the CQI have a short feedback period, they may be transmitted once or more times within a long-term RI and PMI feedback period. If the RI is larger than 1 and $C_{uni}=\{I\}$, W'=W, which means that the codebook transformation scheme falls back to a codebook non-transformation scheme. The processor 155 of the UE calculates an SINR or a transmission amount using the transformed codeword W', and then calculate an optimum short-term PMI W and a CQI based on the calculated SINR or transmission amount. Because the short-term PMI W and the CQI have a short feedback period, they may be transmitted once or more times within a long-term RI and long-term PMI feedback period. The processor 155 of the UE may use the latest long-term RI and long-term PMI in calculating the short-term PMI codebook W and the CQI.

The eNB receives the long-term PMI in a longest feedback period from the UE. Herein, the eNB receives one or more RIs within the long-term PMI feedback period from the UE. The eNB also receives the short-term PMI and the CQI in a short feedback period from the UE. Then the eNB calculates the transformed codebook W in the same manner as done for codebook transformation at the UE and performs scheduling based on the transformed codebook W and the feedback CSI (e.g. the CQI and the RI).

In the above-described codebook configuration, a long-term PMI codebook is of size $N_t \times N_t$ and a short-term PMI codebook is of size $N_t \times r$. Thus a final $N_t \times r$ codebook is created (r is a rank), Alternatively, an $N_t \times r$ codebook may be created by multiplying an $N_t \times r$ PMI codebook by an $r \times r$ PMI codebook. In this case, if the rank is equal to or larger than a predetermined value, an r×r PMI may be limited to an identity matrix or an r×r PMI may be used by limiting an identity matrix to a certain unitary matrix. For example, an $N_t$×r PMI represents the quantized values of dominant singular vectors $V_1, V_2, \ldots V_r$, thus being an LTE Release 8 codebook.

While it has been described above that a long-term PMI and a short-term PMI are transmitted in different subframes, they may be simultaneously transmitted in the same subframe. Especially when the long-term PMI and the short-term PMI are channel information in the frequency domain, not in the time domain, they may be referred to as a wideband PMI and a subband PMI, respectively. The UE may transmit the wideband PMI and the subband PMI together to the eNB. If the UE transmits an RI independently on a PUCCH in a long period to the eNB, it may transmit three pieces of feedback information together, that is, a long-term PMI (or a wideband PMI), a short-term PMI (or a subband PMI), and a CQI together on the PUCCH in a short period to the eNB. The present invention provides two methods for effectively transmitting a short-term PMI, a long-term PMI, and a CQI, when a PMI codebook changes in size according to an RI in this environment.

Figure 7A:
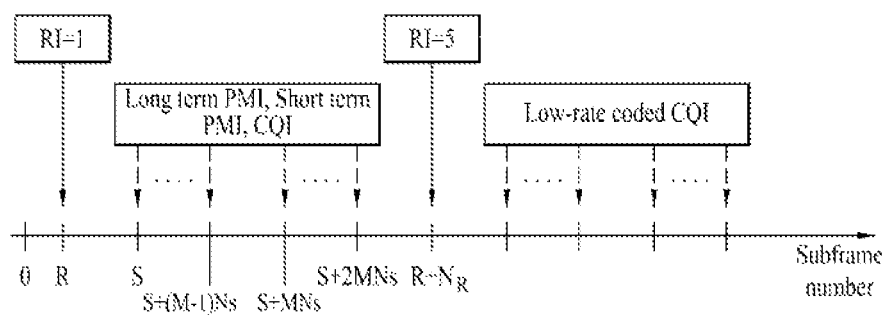
FIGS. 7A and 7B illustrate exemplary methods for feeding back CSI according to different Rank Indicator (RI) values.
Figure 7B:
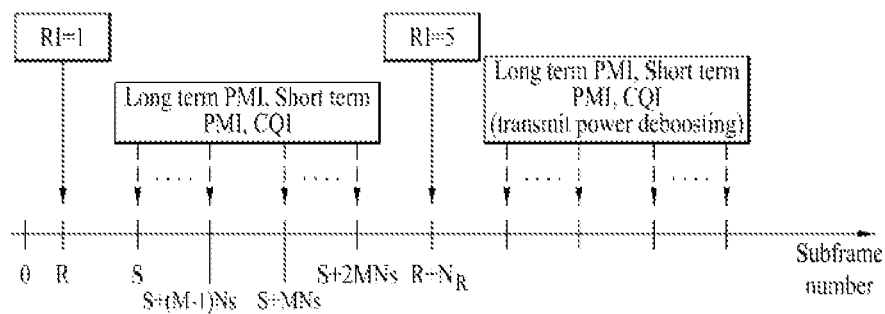

FIGS. 7A and 7B illustrate exemplary methods for feeding back CSI according to different RI values. In FIGS. 7A and 7B, $N_S$ and $N_R$ represents a short-term PMI feedback period and an RI feedback period. The short-term PMI feedback period is equal to a CQI feedback period and a long-term feedback period.

If the size of a codebook decreases with a higher rank, the payload size of a PUCCH carrying a PMI and a CQI may further be reduced for a high rank. For example, if for a rank of 5 or higher, the size of a 8-Tx codebook is fixed to a predetermined value, that is, if the 8-Tx codebook includes only one PMI for a rank of 5 or higher, the UE may feed back only a CQI in case of a rank of 5 or higher, as illustrated in FIG. 7A. When the payload size of a control signal is decreased according to a rank in this manner, the Bit Error rate (BER) of the CQI can be maintained in spite of a low CQI coding rate.

In the LTE system, although channel coding is performed for 11-bit PUCCH payload, if only a CQI is transmitted, the channel coding is performed for a 7-bit source (corresponding to 2 codeword transmission) or a 4-bit source (corresponding to 1 codeword transmission). Therefore, more robust coding is possible. Alternatively or additionally, for the same coding rate, transmission power may be decreased. For example, if a 7-bit CQI: and a 4-bit PMI are allocated to a PUCCH, the PMI is fixed to one value for a predetermined rank, and thus 4 bits out of 11 bits of the PUCCH are fixed to certain bits until the next rank information is generated, while only 7 bits of the PUCCH are used, the same BER can be maintained even though the transmission power is decreased to a predetermined level, as illustrated in FIG. 7B. That is, despite the same coding rate, the same BER can be maintained through power deboosting.

Various embodiments have been described in the best mode for carrying out the invention.

A UE apparatus and method for feeding back CSI in a wireless communication system according to the present invention are applicable to mobile communication systems such as 3GPP LTE, LTE-A, and IEEE 802.16 systems.

Embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that do not explicitly cite in each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for transmitting a Channel State Information (CSI) reporting by a user equipment (UE) in a wireless communication system, the method comprising:

transmitting, by the UE, a rank indicator (RI) with a first type precoding matrix indicator (PMI) to a base station (BS) according to a first CSI feedback type, wherein the first CSI feedback type is defined when a reporting period of the RI is same as that of the first type PMI; and transmitting, by the UE, a second type PMI with channel quality information (CQI) to the BS according to a second CSI feedback type, the second type PMI being calculated based on a latest RI, wherein the RI and the first type PMI are jointly coded, and transmitted through a physical uplink control channel (PUCCH), wherein a reporting period of the first CSI feedback type and a reporting period of the second type PMI are defined separately, and wherein the reporting period of the first CSI feedback type is equal to or longer than the reporting period of the second type PMI.

2. The method of claim 1, wherein the RI and the second type PMI are transmitted in different subframes respectively.

3. The method of claim 1, wherein the first type PMI is a wideband PMI.

4. A user equipment (UE) for transmitting a Channel State Information (CSI) reporting in a wireless communication system, the UE comprising:

a transmitter; and a processor operably coupled to the transmitter, the processor configured to:

control the transmitter to transmit a rank indicator (RI) with a first type precoding matrix indicator (PMI) to a base station (BS) according to a first CSI feedback type, wherein the first CSI feedback type is defined when a reporting period of the RI is same as that of the first type PMI, and calculate a second type PMI based on a latest RI, control the transmitter to transmit the second type PMI with channel quality information (CQI) to the BS according to a second CSI feedback type, wherein the RI and the first type PMI are jointly coded, and transmitted through a physical uplink control channel (PUCCH), wherein a reporting period of the first CSI feedback type and a reporting period of the second type PMI are defined separately, and wherein the reporting period of the first CSI feedback type is equal to or longer than the reporting period of the second type PMI.

5. The UE of claim 4, wherein the RI and the second type PMI are transmitted in different subframes respectively.

6. The UE of claim 4, wherein the first type PMI is a wideband PMI.

7. A method for receiving a Channel State Information (CSI) reporting by a base station (BS) in a wireless communication system, the method comprising:

receiving, by the BS from a user equipment (UE), a rank indicator (RI) with a first type precoding matrix indicator (PMI) according to a first CSI feedback type, wherein the first CSI feedback type is defined when a reporting period of the RI is same as that of the first type PMI; and receiving, by the BS from the UE, a second type PMI with channel quality information (CQI) according to a second CSI feedback type, the second type PMI being calculated based on a latest RI, wherein the RI and the first type PMI are jointly coded, and received through a physical uplink control channel (PUCCH), wherein a reporting period of the first CSI feedback type and the reporting period of the second type PMI are defined separately, and wherein the reporting period of the first CSI feedback type is equal to or longer than the reporting period of the second type PMI.

8. The method of claim 7, wherein the RI and the second type PMI are received in different subframes respectively.

9. The method of claim 7, wherein the first type PMI is a wideband PMI.

10. A base station (BS) for receiving a Channel State Information (CSI) reporting in a wireless communication system, the BS comprising:

a receiver; and a processor operably coupled to the receiver, the processor configured to:

control the receiver to receive a rank indicator (RI) with a first type precoding matrix indicator (PMI) from a user equipment according to a first CSI feedback type, wherein the first CSI feedback type is defined when a reporting period of the RI is same as that of the first type PMI, and control the receiver to receive a second type PMI with channel quality information (CQI) from the UE according to a second CSI feedback type, the second type PMI being calculated based on a latest RI, wherein the RI and the first type PMI are jointly coded, and received through a physical uplink control channel (PUCCH), wherein a reporting period of the first CSI feedback type and a reporting period of the second type PMI are defined separately, and wherein the reporting period of the first CSI feedback type is equal to or longer than the reporting period of the second type PMI.

11. The BS of claim 10, wherein the RI and the second type PMI are received in different subframes respectively.

12. The BS of claim 10, wherein the first type PMI is a wideband PMI.

* * * * *